F. H. Moore

Boot Strap,

No. 1,619, Reissued Feb. 16, 1864.

Witnesses.
J. W. Crombs
Geo. W. Reed

Inventor
F. H. Moore
per Munn & Co
attorneys

UNITED STATES PATENT OFFICE.

F. H. MOORE, OF BOSTON, MASSACHUSETTS.

IMPROVEMENT IN BOOT-STRAPS.

Specification forming part of Letters Patent No. 41,087, dated January 5, 1864; Reissue No. 1,619, dated February 16, 1864.

*To all whom it may concern:*

Be it known that I, F. H. MOORE, of Boston, in the county of Suffolk and State of Massachusetts, have invented a new and useful Improvement in Boot-Straps; and I do hereby declare that the following is a full, clear, and exact description of the same, reference being had to the accompanying drawings, making a part of this specification, in which—

Figure 1:
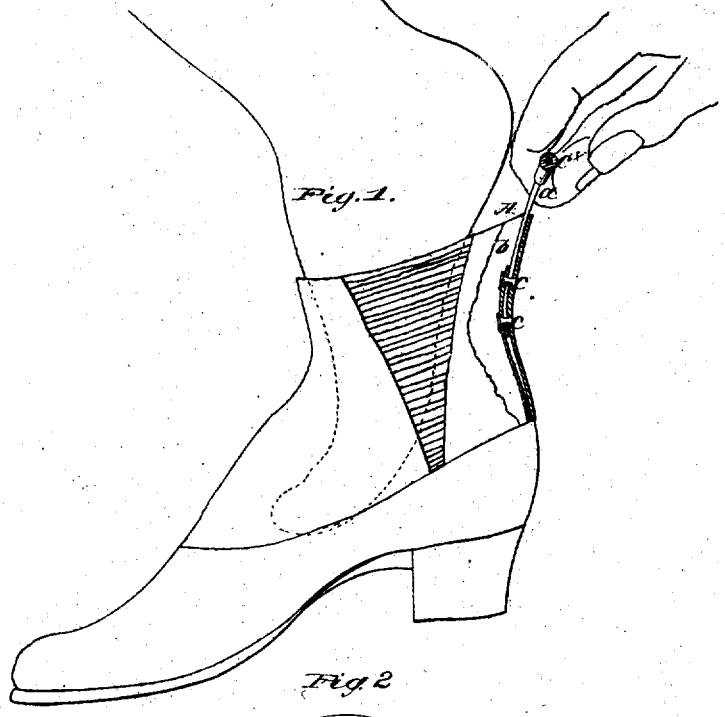
Figure 2:
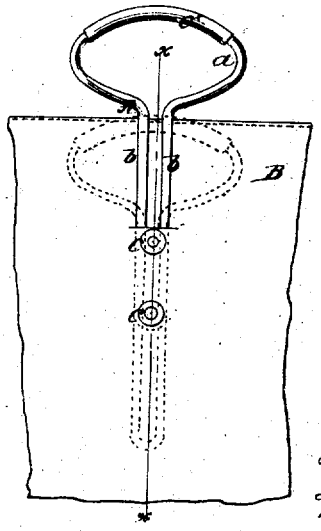

Figure 1 is a section of my invention, taken in the line *x x*, Fig. 2; Fig. 2, a side view of the same.

Similar letters of reference indicate corresponding parts in the two figures.

This invention is designed as a substituted for the ordinary woven or webbing and leather boot straps in common use.

The object of the invention is to supersede the above-named straps by obtaining one that will be more durable, cheaper, or capable of being applied at a less cost, and which will possess the advantage of being manipulated with greater facility than the ordinary straps in use.

To enable those skilled in the art to fully understand and construct my invention, I will proceed to describe it.

A represents the strap, which is constructed of metal, or any rigid, tough, or hard substance which will possess a requisite degree of strength. It is designed, however, to construct the strap of metal—heavy wire, for instance—bent so as to form a loop, *a*, at its upper end of sufficient size to admit, say, of two fingers of the hand passing through it, the lower part being formed of straight parts *b b*, parallel with each other and united at their lower ends in semicircular form, as shown clearly by the dotted lines in Fig. 2, a narrow space being allowed between the parts *b b*.

This strap is attached to the boot by two rivets, *c c*, which pass through the leather and the space between the parts *b b* of the strap, the parts *b b* being sufficiently long to admit of a certain degree of play of the strap sufficient to admit of the loop *a* being drawn upward above the boot-top B, as shown in tint, Fig. 2, and also to admit of it being pressed down inside of the boot-top, as shown in red outline.

Thus it will be seen that when the loops *a* are grasped by the operator for the purpose of drawing on the boots the loops *a* will be drawn up to admit of the fingers being passed through them, and when the boots are drawn on the feet the loops may be pressed down within the boot-top out of the way.

In order to protect the fingers, the loops *a* are covered with leather, $c^{\times}$, or other soft or pliable material. The straps are attached to ordinary boots, one at each side, in the same place as the ordinary flexible straps, and when applied to gaiters or low boots or shoes are attached one to the back part, as shown in Fig. 1.

I do not confine myself to any particular manner of constructing the straps. They may be made of wire bent in proper form, or they may be cast or cut out of plate-metal. Neither do I confine myself to the sliding movement of the strap in order to adjust it down within or by the side of the boot-top so that it may be out of the way, for the straps may be attached to the boot-top by means of rivets or joints so arranged as to admit of the straps, after the boot is drawn on the foot, being turned down either in a forward or backward direction by the side of the boot-top or in an outward direction from it.

This strap does not project as far above the boot-top as the ordinary webbing or leather ones, and they consequently may be permanently attached to the boot-top or arranged so as not to slide or turn down, and still be a great improvement over the flexible ones hitherto used.

Having thus described my invention, what I claim as new, and desire to secure by Letters Patent, is—

A strap for boots and shoes, constructed of metal or other suitable rigid or tough material, attached either permanently to the boot-top or in such a manner as to admit, after the boot or shoe is drawn on the foot, of being turned or shoved down within or at the outer side of the boot-top, substantially as herein set forth.

Witnesses: F. H. MOORE.

THOS. S. J. DONZLERS,

GEO. W. REED.